(12) United States Patent
Nantz et al.

(10) Patent No.: US 6,366,051 B1
(45) Date of Patent: Apr. 2, 2002

(54) SYSTEM FOR AUTOMATICALLY CHARGING THE BATTERY OF A REMOTE TRANSMITTER FOR USE IN A VEHICLE SECURITY SYSTEM

(75) Inventors: John S. Nantz, Brighton; Riad Ghabra, Dearborn Heights; Qingfeng Tang, Novi; Ronald O. King, Brownstown; Douglas C. Campbell, Northville, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/924,284

(22) Filed: Aug. 8, 2001

Related U.S. Application Data

(63) Continuation of application No. 09/566,585, filed on May 8, 2000.

(51) Int. Cl.[7] ............................. H02F 7/00; H02F 7/04
(52) U.S. Cl. .................................. 320/108; 320/158
(58) Field of Search ............................. 320/108, 157, 320/158, 159, 155, 162, 163, 164, 5

(56) References Cited

U.S. PATENT DOCUMENTS

| | | |
|---|---|---|
| 4,395,672 A | 7/1983 | Gassaway |
| 5,572,110 A | 11/1996 | Dunstan |
| 5,606,240 A | 2/1997 | Kokuga et al. |
| 5,640,079 A | 6/1997 | Takamoro |
| 5,717,387 A | 2/1998 | Suman et al. |
| 5,726,555 A | 3/1998 | Nelson et al. |
| 5,754,029 A | 5/1998 | Mann et al. |
| 5,847,546 A | 12/1998 | Sengupta et al. |
| 5,850,188 A | 12/1998 | Doyle et al. |
| 5,870,685 A | 2/1999 | Flynn |
| 6,011,546 A | 1/2000 | Bertram |
| 6,016,047 A | 1/2000 | Notten et al. |
| 6,023,151 A | 2/2000 | Hudson |

*Primary Examiner*—Gregory Toatley
(74) *Attorney, Agent, or Firm*—Brooks & Kushman P.C.

(57) ABSTRACT

A system for automatically charging a battery of a remote keyless entry transmitter includes a voltage monitoring circuit having a first microprocessor which monitors battery voltage and which causes the transmitter to send an RF signal to a receiver in the form of a base station on a motor vehicle. The signal causes a charging circuit of the base station to activate an inductive field to cause the battery to be fully charged. In one embodiment, the first microprocessor also causes the transmitter to send a second signal to the base station to shut down the charging field when the battery voltage reaches a predetermined upper limit. In another embodiment, a second microprocessor of the base station tracks the charging time and shuts down the charging field when the charging time reaches a predetermined amount. Alternatively, charging can be done by direct contact or other means. In this way, the system not only allows for extended battery life by limiting the number of charge cycles on the battery but also allows for optimum discharge of the battery before a charging cycle begins.

8 Claims, 1 Drawing Sheet

SYSTEM FOR AUTOMATICALLY CHARGING THE BATTERY OF A REMOTE TRANSMITTER FOR USE IN A VEHICLE SECURITY SYSTEM

This application is a continuation to application Ser. No. 09/566,585 filed May 2, 2000.

TECHNICAL FIELD

The present invention relates to systems for automatically charging the battery of a remote transmitter which is used in a vehicle security system.

BACKGROUND ART

Rechargeable batteries used in remote transmitters of vehicle security systems currently have typically 1000 charge/discharge cycles before "end of life." Current methodologies allow for a certain level of discharge before the charging cycle begins. However, if the battery is removed from its charging fixture or field before it is fully charged, charging will not commence until that battery voltage drops below a voltage threshold.

U.S. Pat. No. 6,023,151 discloses a "smart" battery method and apparatus including a dynamic end of voltage (EODV) signal for recharging batteries, one that reflects environment, temperature, chemistry, or cycle and provides enhanced runtime and save-to-disk alarm.

U.S. Pat. No. 6,016,047 discloses a battery management system suitable for a "smart" battery including a processor and other means for recovery and producing signals based on temperature, and chemistry status.

U.S. Pat. No. 6,011,546 discloses a "smart" battery, part of a larger system, including provisions for self-monitoring and signals mobile processor battery charge state, readiness for re-use following charging, and modules user interface.

U.S. Pat. No. 5,870,685 discloses a system for monitoring battery capacity in a mobile station including a plurality of different thresholds which may trigger transmission of a signal for shutdown and recharging.

U.S. Pat. No. 5,754,029 discloses a battery charging apparatus including means for controlling battery charging current via calendars stored in PROM and uses specified event dates as well as a microprocessor for sending messages to an RF modulator.

U.S. Pat. No. 5,606,240 discloses a battery charger for a lithium battery including means for lengthening or shortening battery charging time based on a plurality of thresholds including protection, status, charge and time.

U.S. Pat. No. 5,572,110 discloses a "smart" battery charger including a memory for thresholds and parameters, means for automatically controlling the charging operation, and means for optimizing charging based on temperature, time, battery characteristics and requirements.

U.S. Pat. No. 5,847,546 discloses a "smart" battery charging system including a memory and a microprocessor for programming charges and means for generating a charging signal that responds to charging status of the battery being charged.

U.S. Pat. No. 5,850,188 discloses an RKE diagnostic system including means for transmitting a plurality of signals regarding operations including charge status of battery and battery condition.

U.S. Pat. No. 5,717,387 discloses a vehicle control system including the ability to reprogram vehicle operation via transmitting signals such as low battery capable of controlling vehicle accessories.

U.S. Pat. No. 4,395,672 discloses an improved timer for a battery charger including an electric controller and includes a plurality of thresholds and parameters that extend charging cycle and to operate automatically.

Inductive (i.e. magnetic) coupling is a means of transferring electrical energy from one part (area) of a circuit to another part without requiring any ohmic (wire) connection. Instead, magnetic flux linkages couple two inductors (coils). The coils must be in close proximity in order to establish sufficient mutual inductance.

DISCLOSURE OF INVENTION

An object of the present invention is to provide a system for automatically charging the battery of a remote transmitter for use in a vehicle security system wherein charging/discharging of the battery is performed in such a way to fully utilize maximum, battery-life potential.

Another object of the present invention is to provide a system for automatically charging the battery of a remote transmitter for use in a vehicle security system wherein a predetermined level of discharge is achieved before a charging cycle begins and wherein a full charge cycle is completed before the charging cycle is complete.

Yet still another object of the present invention is to provide a system for automatically charging the battery of a remote transmitter for use in a vehicle security system wherein a determining circuit determines when the battery is fully charged. In one embodiment, a microprocessor of the system monitors or tracks charging time to ensure full charge before the charging cycle is complete, even if the battery is removed from the charging field/charging fixture for a period of time and the later placed back in the field/fixture with a voltage above a predetermined lower voltage limit.

In carrying out the above objects and other objects of the present invention, a charging system for automatically charging a battery of a remote transmitter for use in a vehicle security system having a base station is provided. The charging system includes a voltage monitoring circuit for monitoring voltage of the battery and causing the transmitter to transmit a first signal when the voltage drops below a predetermined lower limit. A charging circuit charges the battery during a charging cycle in response to the first signal when the battery is coupled to the charging circuit for charging. A determining circuit determines when the battery is fully charged and provides a corresponding fully charged signal wherein the charging circuit stops charging the battery in response to the fully charged signal.

The charging circuit may be inductively coupled to the battery during charging.

The voltage monitoring circuit includes a first microprocessor programmed to monitor the voltage of the battery.

The determining circuit may include a charging time monitoring circuit for monitoring the amount of time the battery is coupled to the charging circuit and is being charged thereby and providing the fully charged signal when the time reaches a predetermined amount.

The charging time monitoring circuit may include a second microprocessor programmed to monitor the amount of time that the charging circuit charges the battery to ensure that the battery is fully charged before the charging cycle is complete.

The first signal may be an RF signal.

The first microprocessor may further be programmed to cause the transmitter to transmit the fully charged signal when the battery is fully charged.

The fully charged signal may be an RF signal.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
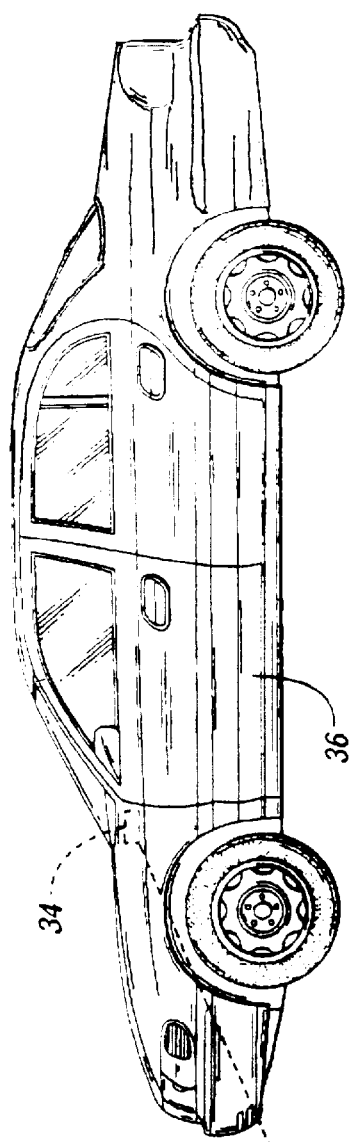
FIG. 1 is a diagrammatic view of a vehicle security system in which a charging system of the present invention operates.

FIG. 1 diagrammatically illustrates a vehicle security system, generally indicated at 20. A transmitter, generally indicated at 22, is shown as a key fob having a plastic housing 24 that is conveniently sized to be carried in a purse or pocket, for example. A plurality of pushbutton switches 26, 27, 28 and 30 are selectively activated by a user to achieve a desired operation in the vehicle security system. As illustrated, the key fob conveniently serves as a key ring for holding one or more keys 32 in a conventional manner.

A receiver or base station 34 responds to the signals sent from the transmitter 22. The base station 34 is supported on a vehicle 36 and controls various security system functions in a conventional manner.

In general, the charging system of the present invention includes a charging circuit that is activated by an RF signal transmitted by the transmitter 22 in response to a low voltage threshold detected by a voltage monitoring circuit, but is deactivated when the battery is fully charged such as once a specified period of charging time has transpired instead of monitoring a low voltage threshold. The system can also allow for continuous charging until the battery reaches an upper level threshold as also monitored by the voltage monitoring circuit. The process is performed automatically without any user intervention. The charging method can be performed using inductive coupling or direct contact. Below is an example of how an inductively-coupled charging system of the invention would function.

Figure 2:
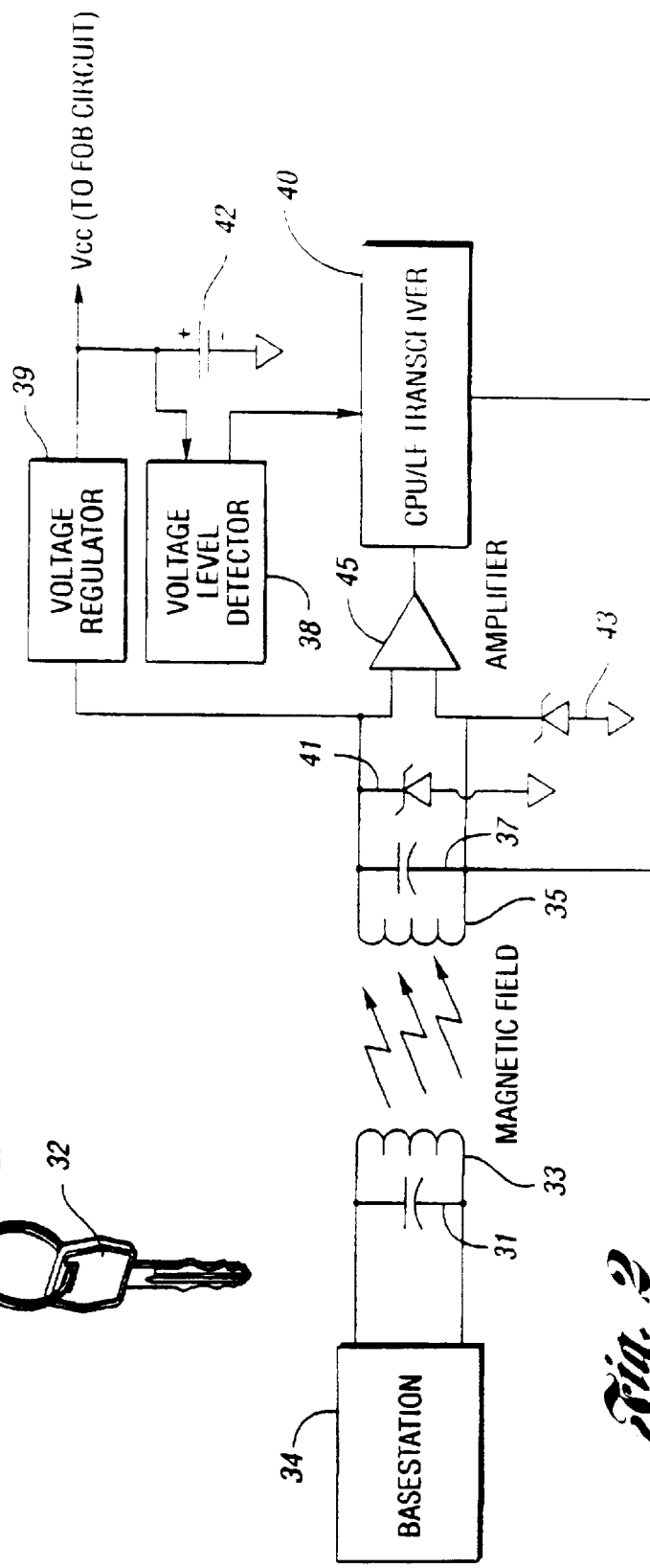
FIG. 2 is a schematic circuit diagram of the charging system of the present invention.

Referring to FIG. 2, the base station 34 includes a conventional charging circuit including a series or parallel connected capacitor 31 and inductor or coil 33. The charging circuit generates a magnetic field preferably having a frequency of about 125 KHz.

The charging circuit further includes a parallel or series connected coil 35 and an inductor or coil 37 to complete the transfer of electrical energy from the coil 33. A voltage regulator 39 of the charging circuit regulates the charging voltage applied to a battery 42.

For normal RF use, a pair of clamping zenar diodes 41 and 43 clamp the inputs to an amplifier 45 of the transmitter 22. In turn, the amplified output is applied to the LF transceiver portion of a CPU/LF transceiver 40.

The battery-operated remote keyless entry (RKE) transmitter 22 is equipped with a voltage level detector 38 connected to the CPU or microprocessor portion of the CPU/LF (low frequency) transceiver 40 that monitors the voltage of the battery 42. The RKE transmitter 22 is also typically equipped with an immobilizer feature that allows for battery-less, inductive operation when placed in the inductive or magnetic field generated by the base station immobilizer located in the vehicle 36.

Once the battery voltage drops below a specified voltage, the detector 38 provides a signal to the microprocessor of the CPU/LF transceiver 40 which changes a bit in the pulses transmitted by the transmitter 22 to let the base station 34, that works in conjunction with the RKE transmitter 22, know that the battery voltage is low. The charging circuit of the base station 34 located in the vehicle 36 continues to activate the inductive field until the RKE transmitter battery 42 is fully charged.

The methodology for determining when the battery is "fully charged" utilizes either one or both of the following:

The detector 38 and the CPU/LF transceiver 40 of the transmitter 22 monitor voltage until an upper voltage threshold is achieved, then the transmitter 22 transmits a pulse to the base station 34 indicating such.

The base station 34, once it receives a low voltage indication, continues to charge that particular transmitter 22 for a specified period of time before the charging field generated by the charging circuit is shut down. A charging time monitoring circuit including a second microprocessor of the base station 34 tracks the charging time together with an associated transmitter ID, as multiple transmitters may be used with a single base station 34.

This process is performed to eliminate unnecessary charging cycles and to fully charge the battery 42 between cycles instead of only charging the battery 42 to a level slightly above the low voltage threshold.

While the best mode for carrying out the invention has been described in detail, those familiar with the art to which this invention relates will recognize various alternative designs and embodiments for practicing the invention as defined by the following claims.

What is claimed is:

1. A charging system for automatically charging a battery of a remote transmitter, the charging system comprising:

a voltage monitoring circuit for monitoring voltage of the battery and causing the transmitter to transmit a first signal when the voltage drops below a predetermined lower limit;

a charging circuit for charging the battery during a charging cycle in response to the first signal when the battery is coupled to the charging circuit for charging; and a determining circuit for determining when the battery is fully charged and providing a corresponding fully charged signal wherein the charging circuit stops charging the battery in response to the fully charged signal.

2. The charging system as claimed in claim 1 wherein the charging circuit is inductively coupled to the battery during charging.

3. The charging system as claimed in claim 1 wherein the voltage monitoring circuit includes a first microprocessor programmed to monitor the voltage of the battery.

4. The charging system as claimed in claim 1 wherein the determining circuit includes a charging time monitoring circuit for monitoring the amount of time the battery is coupled to the charging circuit and is being charged thereby and providing the fully charged signal when the time reaches a predetermined amount.

5. The charging system as claimed in claim 4 wherein the charging time monitoring circuit includes a second microprocessor programmed to monitor the amount of time that the charging circuit charges the battery to ensure that the battery is fully charged before the charging cycle is complete.

6. The charging system as claimed in claim 1 wherein the first signal is an RF signal.

7. The charging system as claimed in claim 3 wherein the first microprocessor is further programmed to cause the transmitter to transmit the fully charged signal when the battery is fully charged.

8. The charging system as claimed in claim 7 wherein the fully charged signal is an RF signal.

* * * * *